United States Patent
Obrist et al.

(10) Patent No.: US 11,697,504 B2
(45) Date of Patent: Jul. 11, 2023

(54) BATTERY SYSTEM

(71) Applicant: OBRIST TECHNOLOGIES GMBH, Lustenau (AT)

(72) Inventors: Frank Obrist, Bregenz (AT); Oliver Obrist, Dornbirn (AT); Martin Graz, Lustenau (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 158 days.

(21) Appl. No.: 16/482,080

(22) PCT Filed: Mar. 14, 2018

(86) PCT No.: PCT/EP2018/056380
§ 371 (c)(1),
(2) Date: Jul. 30, 2019

(87) PCT Pub. No.: WO2018/172157
PCT Pub. Date: Sep. 27, 2018

(65) Prior Publication Data
US 2020/0044214 A1    Feb. 6, 2020

(30) Foreign Application Priority Data
Mar. 21, 2017   (DE) .......................... 102017106068.5

(51) Int. Cl.
*H01M 50/20*    (2021.01)
*B64D 27/24*    (2006.01)
(Continued)

(52) U.S. Cl.
CPC .......... *B64D 27/24* (2013.01); *H01M 10/425* (2013.01); *H01M 10/482* (2013.01);
(Continued)

(58) Field of Classification Search
CPC .... H01M 50/20; H01M 50/24; H01M 50/502; H01M 10/613; H01M 10/625;
(Continued)

(56) References Cited

U.S. PATENT DOCUMENTS 4,908,281  A  *  3/1990  O'Callaghan ....... H01M 12/065
                                                        429/405
2009/0214900  A1   8/2009  Hoffjann et al.
(Continued)

FOREIGN PATENT DOCUMENTS

CN     102324465      1/2012
CN     103443957      12/2013
(Continued)

OTHER PUBLICATIONS

Machine English translation of JP 2011-207321 (Year: 2011).*
(Continued)

*Primary Examiner* — Michael L Dignan
(74) *Attorney, Agent, or Firm* — Barnes & Thornburg LLP

(57) ABSTRACT

A battery system, in particular for an aircraft, having a housing, which is sealed gas-tight, and a cell block, which is formed from a plurality of battery cells connected electrically and mechanically by contact plates. The housing can be connected to a vacuum pump in order to generate vacuum within the housing and a vacuum prevails within the housing, wherein at least one housing side wall of the housing is flexible enough that the housing side wall is tensioned together with the cell block by the vacuum acting within the housing. A vehicle, in particular an aircraft, may be electrified, at least in part, by such a battery system.

11 Claims, 3 Drawing Sheets

Figure 1:
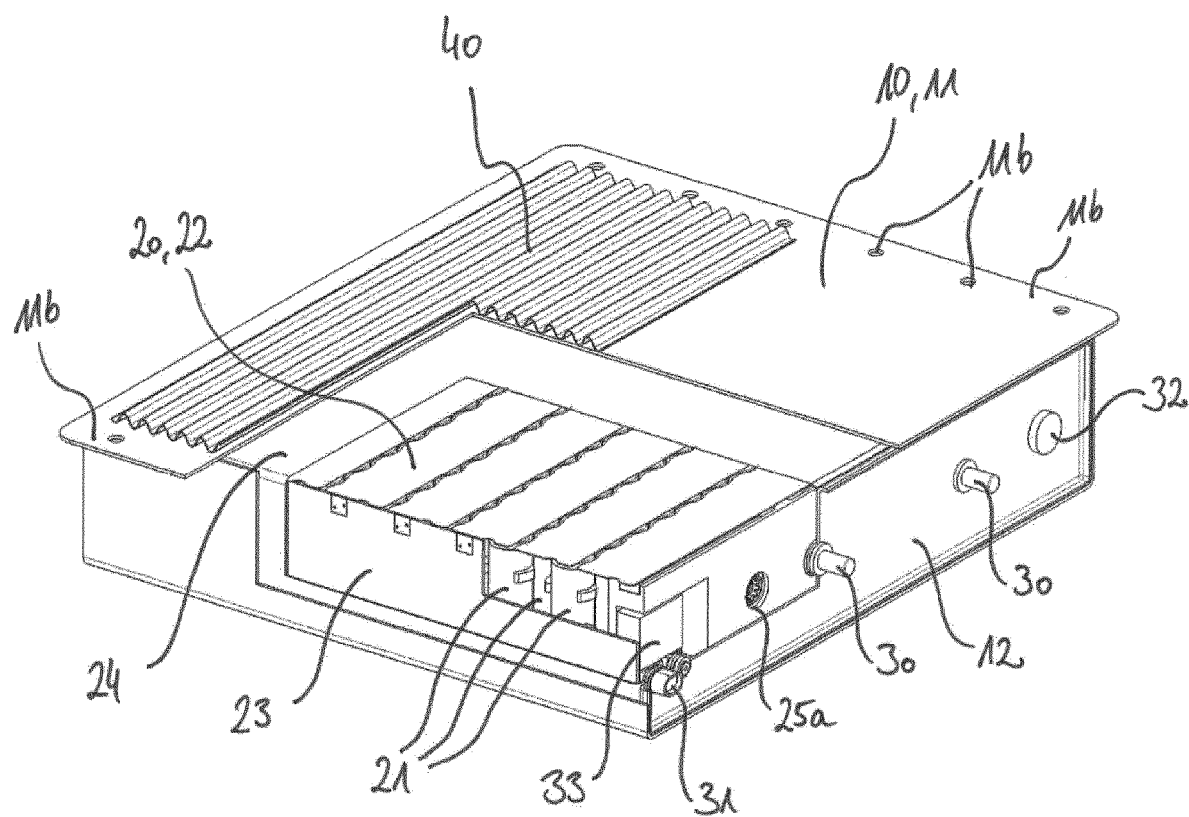

(51) Int. Cl.
  *H01M 10/613* (2014.01)
  *H01M 10/625* (2014.01)
  *H01M 10/42* (2006.01)
  *H01M 10/48* (2006.01)
  *H01M 50/24* (2021.01)
  *H01M 50/284* (2021.01)
  *H01M 50/249* (2021.01)
  *H01M 50/224* (2021.01)
  *H01M 50/519* (2021.01)
  *H01M 50/516* (2021.01)

(52) U.S. Cl.
  CPC ....... *H01M 10/613* (2015.04); *H01M 10/625* (2015.04); *H01M 50/224* (2021.01); *H01M 50/24* (2021.01); *H01M 50/249* (2021.01); *H01M 50/284* (2021.01); *H01M 50/519* (2021.01); *H01M 50/516* (2021.01); *H01M 2010/4271* (2013.01); *H01M 2200/20* (2013.01); *H01M 2220/20* (2013.01)

(58) Field of Classification Search
  CPC ............. H01M 10/425; H01M 10/482; H01M 2010/4271; H01M 2200/20; H01M 10/643; H01M 10/48; B64D 27/24; Y02E 60/10
  See application file for complete search history.

(56) References Cited

U.S. PATENT DOCUMENTS

| | | | | |
|---|---|---|---|---|
| 2011/0293998 | A1* | 12/2011 | Sato | H01M 50/20 429/159 |
| 2012/0244393 | A1* | 9/2012 | Stanek | H01M 50/20 429/50 |
| 2013/0004808 | A1* | 1/2013 | Tschismar | B60L 58/27 429/82 |
| 2013/0192807 | A1* | 8/2013 | DeKeuster | H01M 10/6556 165/170 |
| 2013/0280575 | A1 | 10/2013 | Obrist et al. | |
| 2014/0174150 | A1 | 6/2014 | Yajima | |
| 2015/0210182 | A1* | 7/2015 | Phlegm | H01M 50/10 429/50 |
| 2016/0093848 | A1* | 3/2016 | DeKeuster | H01M 10/425 429/151 |
| 2016/0351980 | A1* | 12/2016 | Herntier | H01M 10/6556 |
| 2017/0352849 | A1 | 12/2017 | Obrist et al. | |
| 2017/0373289 | A1* | 12/2017 | Lee | H01M 10/6554 |
| 2018/0062224 | A1* | 3/2018 | Drabon | H01M 10/615 |

FOREIGN PATENT DOCUMENTS

| | | | |
|---|---|---|---|
| CN | 203461366 U | 3/2014 | |
| CN | 203536487 U | 4/2014 | |
| CN | 103900767 | 7/2014 | |
| CN | 104303358 | 1/2015 | |
| CN | 205680723 U | 11/2016 | |
| CN | 206003861 U | 3/2017 | |
| DE | 102009058444 | 6/2011 | |
| DE | 102012208509 | 11/2013 | |
| DE | 102012223756 | 6/2014 | |
| DE | 102013021332 | * 6/2015 | ............. H01M 2/10 |
| DE | 102014114019 | 3/2016 | |
| JP | 2000138044 | 5/2000 | |
| JP | 2009514151 | 4/2009 | |
| JP | 2011-207321 | * 10/2011 | ............... B60K 1/04 |
| JP | 2011207321 | 10/2011 | |
| KR | 1020120104287 | 9/2012 | |
| WO | WO 2013/116355 | 8/2013 | |

OTHER PUBLICATIONS

Machine English translation of 102013021332 (Year: 2013).*
Search Report issued in Int'l App. No. PCT/EP2018/056380 (2018).
English Translation of Office Action issued in Appl. No. CN 201880010517.5 (2021).

* cited by examiner

BATTERY SYSTEM

CROSS REFERENCE TO RELATED APPLICATIONS

This application is a U.S. nationalization under 35 U.S.C. § 371 of International Application No. PCT/EP2018/056380, filed Mar. 14, 2018, which claims priority to German Patent Application No. 102017106068.5, filed 21 Mar. 2017. The disclosures set forth in the referenced applications are incorporated herein by reference in their entireties.

The invention relates to a battery system having the features of the precharacterizing part of claim 1. A battery system of this type is known for example from the DE 10 2014 114 019 A1 stemming from the present applicant.

The known battery system provides for a curable fill material to realize a bracing of the housing with a cell block contained therein. The fill material is contained in a pressure pocket arranged between the cell block and the housing. The pressure pocket is pressurized with positive pressure so that the cell block is tightly braced within the housing. The fill material then hardens and stabilizes the bracing.

In the context of the further development, it was shown that particularly the aviation industry places specific requirements on battery systems. To be used in aircraft, the battery system is to be optimized in terms of its weight and stability, whereby ideally efficiency is also increased.

The task of the invention is therefore that of presenting a further development of the previously known battery system which is characterized by low weight and high stability as well as efficiency. A further task of the invention is specifying a vehicle, in particular an aircraft, having such a battery system.

With respect to the battery system, the invention solves this task by the subject matter of claim 1 and with, respect to the vehicle, the subject matter of claim 11.

The invention is thus based on the concept of specifying a battery system, in particular for an aircraft, having a closed gas-tight housing and a cell block, wherein the cell block is formed from a plurality of battery cells electrically and mechanically connected together by contact plates. The housing is connectable or connected to a vacuum pump for generating a negative pressure within the housing. A negative pressure prevails within the housing, whereby at least one housing side wall of the housing is flexible enough that the housing side wall is braced to the cell block by the negative pressure prevailing in the housing.

Advantageously provided with the invention is for the bracing between the housing and the cell block of the battery system to be obtained by negative pressure as in particular permanently acting within the housing. The housing can thus be configured with relatively minimal wall thickness and is nevertheless sufficiently stable. At the same time, the weight of the battery system is reduced by the housing's minimal wall thickness. The bracing of the housing with the cell block furthermore ensures achieving good thermal transfer from the cell block to the housing. This improves the cooling of the battery cells and thus increases the efficiency and lifespan of the battery system.

It is generally advantageous with respect to the use of the battery system in the field of aviation, specifically aboard aircraft, for the battery system to have the highest possible energy content at the lowest possible mass and/or lowest possible volume. Therefore, particularly the mass of battery system components which have no energy storage function should be greatly reduced. The ratio of the mass of energy-storing components; i.e. the sum mass of all the battery cells of the battery system, to the mass of the battery system as a whole should therefore be as large as possible. The structural design according to the invention achieves a particularly good ratio between the sum mass of the battery cells and the mass of the battery system as a whole (including, inter alia, the housing). Particularly achieved is a ratio of at least 0:85, in particular between 0:85 and 0:95, in particular between 0:9 and 0:95. In other words, the sum mass of the battery cells within the battery system accounts for at least 85%, in particular between 85% and 95%, particularly between 90% and 95% of the battery system's total mass.

The same applies to the ratio between the cumulative volume of all the battery cells of the battery system to the total volume of the battery system. The invention's negative pressure bracing and thereby accompanying feasibility of reducing the housing wall thickness achieves a reduction in the total volume of the battery system. Thus achievable is a volume ratio between the cumulative volume of all the battery system's battery cells to the total volume of the battery system amounting to at least 0:75, particularly between 0:75 and 0:95, in particular between 0:8 and 0:9. In other words, all the battery cells within the battery system combined account for at least 75%, particularly between 75% and 95%, in particular between 80% and 90% of the total volume of the battery system.

By means of a pressure sensor for controlling the vacuum pump optionally arranged within the housing, it is advantageously possible to control the negative pressure within the housing. The vacuum pump can in particular be periodically activated when the negative pressure within the housing drops below a predetermined threshold. Safety monitoring can thereby be implemented. In particular, the pressure sensor can be connected to a control unit adapted to emit a control signal when the measured value of the pressure sensor is outside of a predetermined safety range.

A time-based monitoring of pressure loss can furthermore ensue in the context of the safety monitoring. When the negative pressure within the housing does not reach the set value within a predetermined time frame or the temporal intervals between necessary activations of the vacuum pump become shorter, different measures can be initiated by the control unit, for example the emitting of a warning signal and/or the switching off of the battery system.

The cell block preferably comprises a circuit board for a battery monitoring system which is arranged laterally along the battery cells and electrically connected to the contact plates. The safety monitoring can be part of the battery monitoring system. In particular, the control unit can be connected to the battery monitoring system. The control unit in particular constitutes a superordinate unit, whereby the battery monitoring system can form a part of the control unit. The control unit is in this case preferably adapted such that a control signal will be received when the battery monitoring system detects a safety-critical malfunction of a battery cell. It can specifically be provided for the battery monitoring system to send a control signal to the control unit when it detects a safety-critical malfunction of a battery cell.

The control unit is preferably integrated into a master/slave bus system. Multiple battery systems can be connected together and individually controllable by means of the master/slave bus system. It is specifically provided for the battery system to form part of a master/slave bus system. Multiple battery systems can thus be integrated into the bus system as slaves. A superordinate bus controller forms the master able to individually control the individual slaves; i.e. the battery systems. The electronic slave components are in each case preferably embedded as subunits in the battery monitoring system or respectively battery management system (BMS) of a battery system. The electronic slave components can in particular be arranged on the circuit board of the battery monitoring system.

In one preferential embodiment, the cell block is encased by an electrically insulating, thermoconductive insulating casing, wherein the housing side wall rests directly against the insulating casing. The housing advantageously comprises a connection for the vacuum pump which opens out into the interior of the housing. Due to its flexibility, the insulating casing forms a flat contact surface for the housing side wall. A gap-free fitting of the housing side wall against the insulating casing and a gap-free fitting of the insulating casing against the cell block is thereby ensured. This ensures good bracing and good thermoconductive contact so that heat transfer from the cell block to the outside in particular is improved.

In order to achieve low weight and good heat transmission, it is preferentially provided for at least the housing side wall, in particular the entire housing, to be formed from aluminum sheeting. In preferential embodiments, the wall thickness of the housing side wall, in particular the entire housing, amounts at most to 2 mm, particularly 1.5 mm at most, particularly 1.2 mm at most, particularly 1 mm at most. Specifically, the housing can be formed from an aluminum sheet having the aforementioned wall thickness.

The good heat transfer from the cell block to the housing obtained by the negative pressure bracing advantageously enables the battery system to be efficiently cooled passively. In particular, at least one cooling element, particularly a passive cooling element, can be arranged on an outer surface of the housing side wall to that end. An optional active cooling system can thus be of reduced-weight design or may possibly be completely unnecessary. This reduces the weight of the battery system and improves the energy efficiency without compromising the operational performance of the cell block.

It is preferentially provided for the vacuum pump to be electrically connectable or connected to the cell block. In particular, electrical energy can be or is supplied to the vacuum pump by the battery cells. This thereby creates a self-sufficient system able to operate without an external power supply, at least after first being initially started.

In order to generate the negative pressure within the housing, it can in particular be provided for the vacuum pump to be externally activated a single time when the battery system is first initially started. The subsequent power supplying of the vacuum pump is preferably via the cell block exclusively. An external power supply is thus unnecessary.

The invention further relates to a vehicle, particularly an at least partly electrified aircraft, having a battery system as described above.

Figure 2:
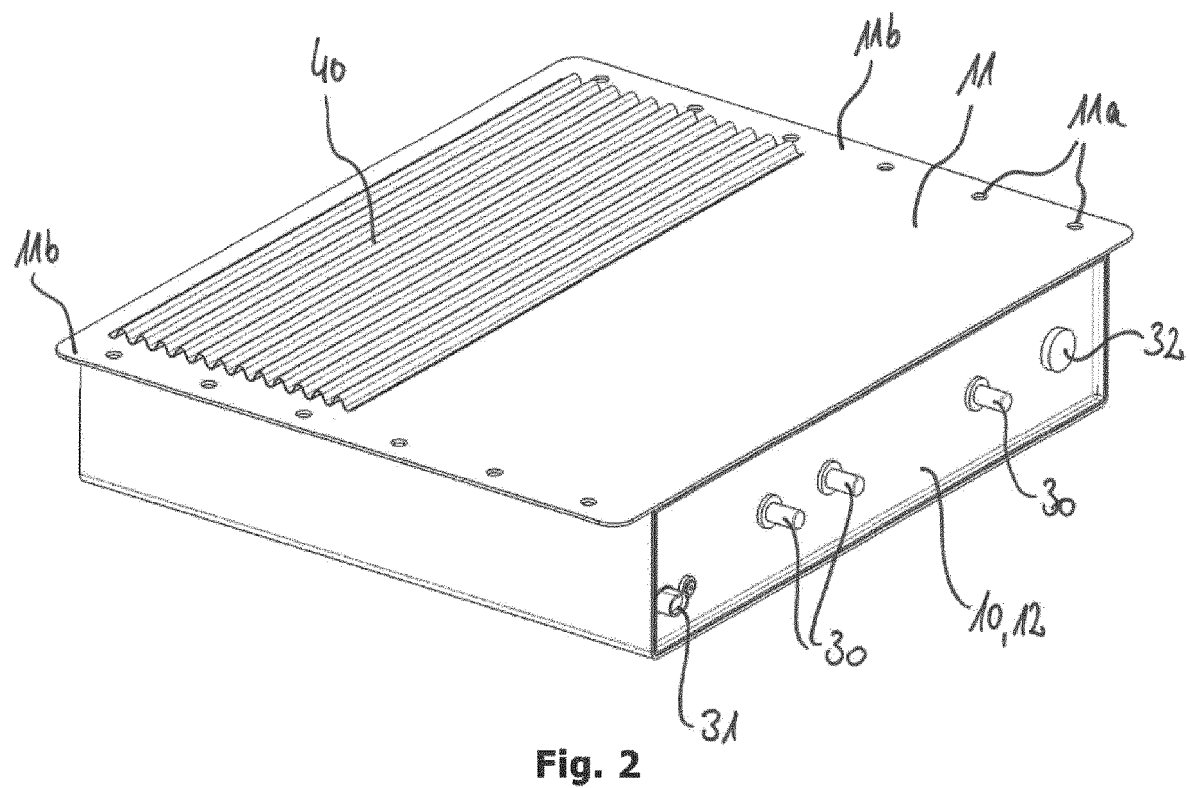
Figure 3:
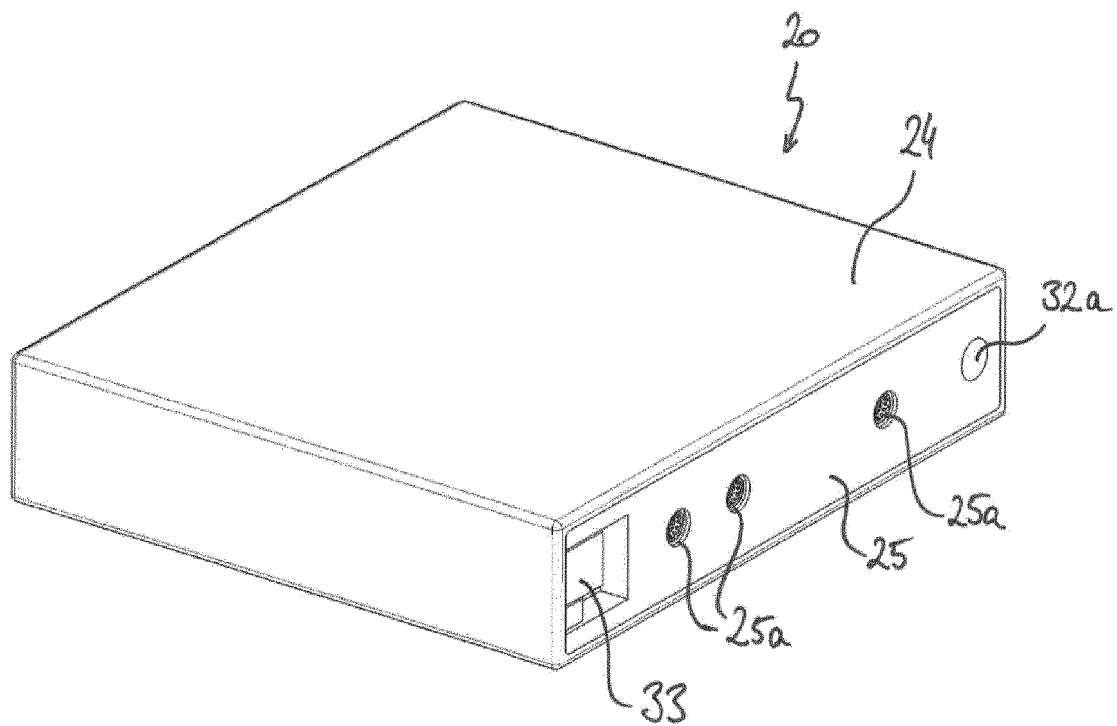
Figure 4:
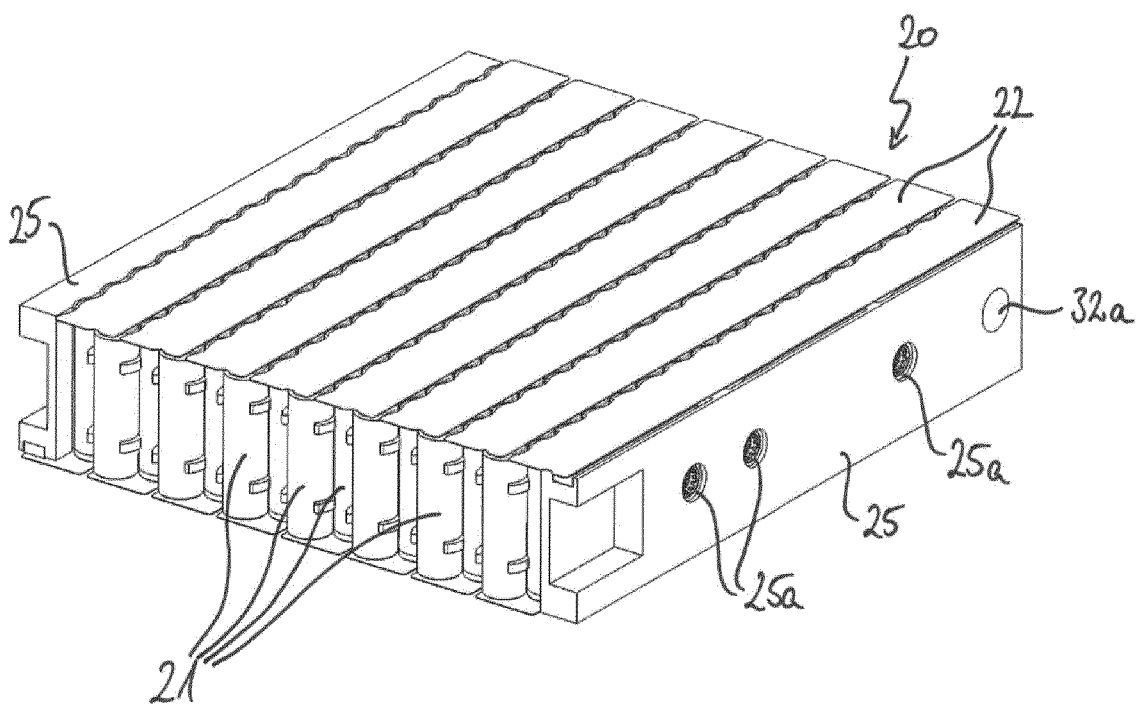
Figure 5:
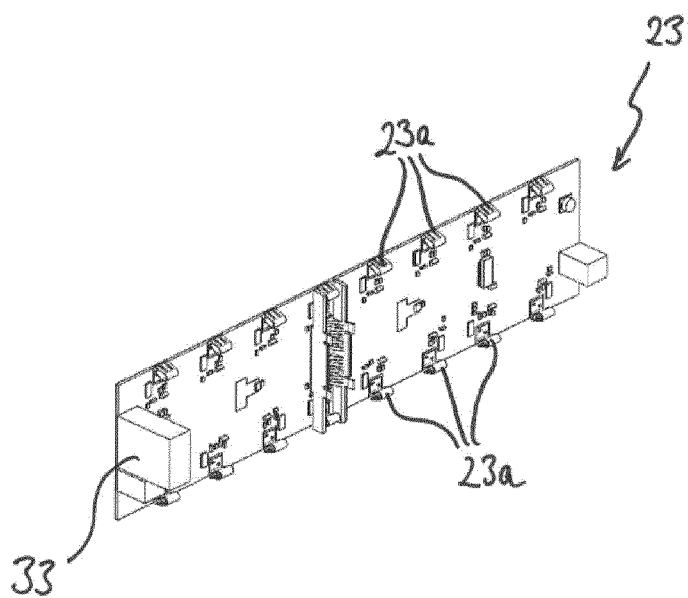

The following will reference the accompanying drawings in describing the invention in greater detail on the basis of an exemplary embodiment. Shown are:

FIG. 1 a perspective, partially sectioned view of a battery system according to the invention;

FIG. 2 a perspective view of the battery system according to FIG. 1;

FIG. 3 a perspective view of the cell block with insulating casing of the battery system according to FIG. 1;

FIG. 4 a perspective view of the cell block of the battery system according to FIG. 1; and FIG. 5 a perspective view of the circuit board of the battery system according to FIG. 1.

The battery system described herein comprises a cell block, preferably a single cell block 20, formed by a plurality of battery cells 21. The battery cells 21 are preferably arranged flush against each other in staggered rows at low packing density. In particular lithium-ion round cells, preferably 18650/2170 type, are used as battery cells 21. The cell block 20 can have a voltage of 48 volts or 60 volts. The electrical output amounts to between 2.1 kWh and 3.3 kWh. The battery system preferably exhibits a surface area of 200×200 mm.

The battery cells 21 are electrically and mechanically connected by contact plates 22 (FIG. 4). The contact plates 22 extend over the battery terminals and are welded to same, preferably by means of laser welding. One contact plate 22 in each case connects two rows of battery cells 21.

A circuit board 23 is arranged along the side of the cell block 20. The circuit board 23 incorporates a battery monitoring system and a plurality of clip contacts 23a electrically connected to the contact plates 22. The clip contacts 23a are arranged such that each row of battery cells 21 can be individually monitored. The circuit board 23 is shown in detail in FIG. 5.

The cell block 20 is encased by an insulating casing 24. The insulating casing 24 is formed from an electrically insulating and thermoconductive material. The insulating casing 24 is in particular formed by a flexible foil able to be tightly fit to the cell block 20. The insulating casing 24 encases the cell block 20 as well as connection modules 25 arranged at the end faces of the cell block 20. The connection modules 25 comprise the essential electrical connections and any potentially applicable pneumatic/hydraulic connections for connecting the battery system to external components.

As is clearly identifiable in FIG. 3, access openings 25a for connecting a vacuum pump 33 are arranged in a frontal connection module 25 of the cell block 20. The access openings 25a open into the insulating casing. The vacuum pump 33 is preferably electrically connectable to the cell block 20 and in particular operable at the rated voltage (48V and 60V) of the cell block 20. The vacuum pump 33 is connected to the circuit board 23, in particular the battery monitoring or respectively battery management system (BMS).

The housing 10 of the battery system is formed from an aluminum sheet having a wall thickness of preferably 1 mm. The housing 10 has two housing end walls 12 which cover the connection modules 25. The side surfaces of the housing 10 are formed by housing side walls 11 welded to the housing end walls 12 so as to be gas-tight. The housing side walls 11 encase the cell block 20. Preferably, the housing side walls 11 directly abut the insulating casing 24 of the cell block 20.

As is clearly identifiable in FIGS. 1 and 2, an upper housing side wall 11 has two projecting lengths 11a with mounting holes 11b. The battery system can thus be easily mounted in a vehicle, in particular a wing of an aircraft.

The housing side wall 11, in particular the upper and/or lower housing side wall 11, can be equipped with a cooling element 40 as indicated in FIGS. 1 and 2. The cooling element 40 can be formed by a corrugated aluminum structure. The cooling element 40 is preferably fixed to the housing side wall 11 so as to enable good thermal conduction.

The housing 10 comprises at least one connection 30 which extends into the housing 10 and is connectable or connected to the negative pressure or vacuum pump 33. The connection 30 is in particular arranged in the housing end wall 12. A negative pressure can be set within the housing 10 via the vacuum pump 33 connection. The negative pressure causes the flexible insulating casing 24 to deform and fit tightly against the cell block 20. In the embodiment shown here, three connections 30 are provided in the housing end wall 12.

It can in general be provided for at least one connection 30 to incorporate a check valve so that the negative pressure persists within the housing 10 after the vacuum pump 33 switches off. For safety reasons, it is additionally advantageous for the housing 10 to also be equipped with a pressure relief valve 32. Such a pressure relief valve 32, which opens to the outside upon a predetermined pressure being exceeded within the housing 10, is depicted in FIGS. 1 and 2.

Visible in FIGS. 3 and 4 is that the connection module 25 comprises a corresponding through-hole 32a for accommodating the pressure relief valve 32.

Due to the material selection (aluminum) and the small wall thickness (1 mm), the housing side wall 11, in particular the upper and/or lower housing side wall 11, exhibits a certain flexibility and is likewise deformed by the negative pressure. The housing side wall 11 thereby tightly abuts the insulating casing 24 tightly encasing the cell block 20. The housing 10 is thus braced to the cell block 20.

The housing end wall 12 further incorporates an electrical connection 31 for electrically connecting the battery system to external components. The electrical connection 31 can include a data line, in particular for connecting to a master/slave bus system. The electrical connection 31 is preferably arranged off-center and vertically offset so as to create a secure mounting for proper electrical connection to external components. Preferably, the battery system comprises two differently polarized electrical connections 31 arranged in oppositely disposed housing end walls 12. For example, the positive terminal connection can be arranged on a front housing end wall 12 and the negative terminal connection on a rear housing end wall 12. Doing so creates a high buffer distance between the electrical connections 31, which is advisable due to the high amperages. This thereby further increases reverse polarity protection.

The vacuum pump 33 provided for maintaining the negative pressure within the housing 10 can be at least indirectly connected to the electrical connection 31. The battery system itself thus supplies the vacuum pump 33 with the necessary operating voltage such that the entire system is self-sufficient.

Further provided is for the self-regulating activation of the vacuum pump 33. To this end, the battery system comprises a pressure sensor which is arranged within the housing 10. The pressure sensor, which is connected to a suitable control unit, continuously monitors the negative pressure within the housing 10. As soon as the negative pressure leaves a predetermined setpoint range or falls below a predetermined setpoint respectively, the control unit sends a control signal to the vacuum pump 33 so that the vacuum pump 33 is activated. When the negative pressure thereupon reaches the predetermined setpoint again, the control unit then sends a further control signal to stop the vacuum pump 33.

Safety monitoring can further be implemented by means of the pressure sensor. For example, if the control unit detects that the negative pressure is unable to be sustained for a long enough period or that the negative pressure leaves the setpoint range too often or too quickly respectively, it can thus be assumed that there is a leakage in housing 10. The control unit then sends a control command which for example initiates the emitting of an warning signal and/or the switching off of the battery system. Furthermore, the control signal can activate a second battery system which can be provided as a backup module in a vehicle, in particular an aircraft. The second battery system is preferably integrated into the master/slave bus system.

The control unit can output appropriate control signals, in particular in terms of safety-relevant events, also on the basis of the battery monitoring system data. For example, the emitting of a warning signal and/or the switching off of the battery system can thus be initiated when, based on the data of the battery monitoring system, it is detected that individual battery cells 21 are being insufficiently charged and a cell failure is therefore to be assumed.

For mounting the cell block 20 in the housing 10, the top, bottom and sides of the cell block 20 are first encased in the flexible insulating casing 24. The insulating casing 24 is preferably formed from a material which is electrically non-conductive yet has good thermal conductivity. The insulating casing 24 can in particular be formed by a foil. The wall thickness and/or foil thickness of the insulating casing 24 preferably amounts to between approximately 0.1 mm and approximately 0.5 mm, in particular approximately 0.3 mm. It is advantageously provided for at least one side of the insulating casing 24 to be provided with an adhesive layer or it respectively be designed to be adhesive on one side.

The encasing of the cell block 20 with the insulating casing 24 advantageously ensues by way of the adhesive side of the insulating casing 24 forming an outer surface of the encased cell block 20. The side of the insulating casing 24 facing the cell block 20 is preferably non-adhesive.

The housing side walls 11 and the housing end walls 12 are then subsequently placed around the encased cell block 20 and, on the one hand, bonded to the insulating casing 24 under pressure and, on the other hand, welded together in fluid-tight manner while maintaining the joining pressure. The housing 10 and the cell block 20 are thus firmly connected together.

In the next step, the vacuum pump 33 is connected to the thus completed battery system and the housing 10 evacuated or a negative pressure built up within the housing 10 respectively. The housing 10 is thus tightly braced to the cell block 20. The cell block 20 is in this way so firmly embedded into the housing 10 that the acceleration forces acting on the housing 10, which can be considerable particularly when the battery system is used in aircraft, are transmitted directly to the cell block 20. The cell block 20 thereby follows the acceleration or deceleration of the housing 10. A force exerted on the housing 10 by the acceleration of the cell block 20 mass and the accompanying deformation of the housing 10 is thus significantly reduced.

LIST OF REFERENCE NUMERALS 10 housing
11 housing side wall
11a projecting length
11b mounting hole
12 housing end wall
20 cell block
21 battery cell
22 contact plate
23 circuit board
23a clip contact
24 insulating casing
25 connection module
25a access opening
30 vacuum pump connection 31 electrical connection
32 pressure relief valve
32a through-hole
33 vacuum pump
40 cooling element

The invention claimed is:

1. A battery system comprising a closed gas-tight housing and a cell block formed from a plurality of battery cells electrically connected and mechanically fixed together by contact plates, wherein the housing is connectable to a vacuum pump for generating a negative pressure within the housing and a negative pressure prevails within said housing, and wherein at least one housing side wall of the housing is flexible enough that the housing side wall is braced to the cell block by the negative pressure prevailing in the housing, wherein the at least one housing side wall is formed from aluminum sheeting with a wall thickness of at most 2 mm, wherein, a pressure sensor is arranged within the housing for controlling the vacuum pump which is connected to a control unit adapted to emit a control signal when the measured value of the pressure sensor is outside of a predetermined safety range, and wherein, the vacuum pump is electrically connected to the cell block and is supplied with electrical energy by the battery cells.

2. The battery system according to claim 1, wherein, the cell block comprises a circuit board for a battery monitoring system which is arranged laterally along the battery cells and electrically connected to the contact plates.

3. The battery system according to claim 2,
wherein, the control unit is connected to the battery monitoring system, in particular integrated into the battery monitoring system, wherein the control unit is adapted such that a control signal is emitted when the battery monitoring system detects a safety-critical malfunction of a battery cell.

4. The battery system according to claim 2,
wherein, the control unit is integrated into a master/slave bus system of the circuit board.

5. The battery system according to claim 1, wherein, the cell block is encased by an electrically insulating, thermo-conductive insulating casing, wherein the housing side wall rests directly against the insulating casing.

6. The battery system according to claim 5,
wherein, the housing comprises at least one connection for the vacuum pump which opens out into the interior of the housing.

7. The battery system according to claim 1, wherein, the wall thickness is at most 1.5 mm.

8. The battery system according to claim 7, wherein, the wall thickness is at most 1.2 mm.

9. The battery system according to claim 8, wherein, the wall thickness is at most 1 mm.

10. The battery system according to claim 1, wherein, at least one passive cooling element is arranged on an outer surface of the housing side wall.

11. An aircraft, having a battery system according to claim 1.

* * * * *